United States Patent Office 3,470,246
Patented Sept. 30, 1969

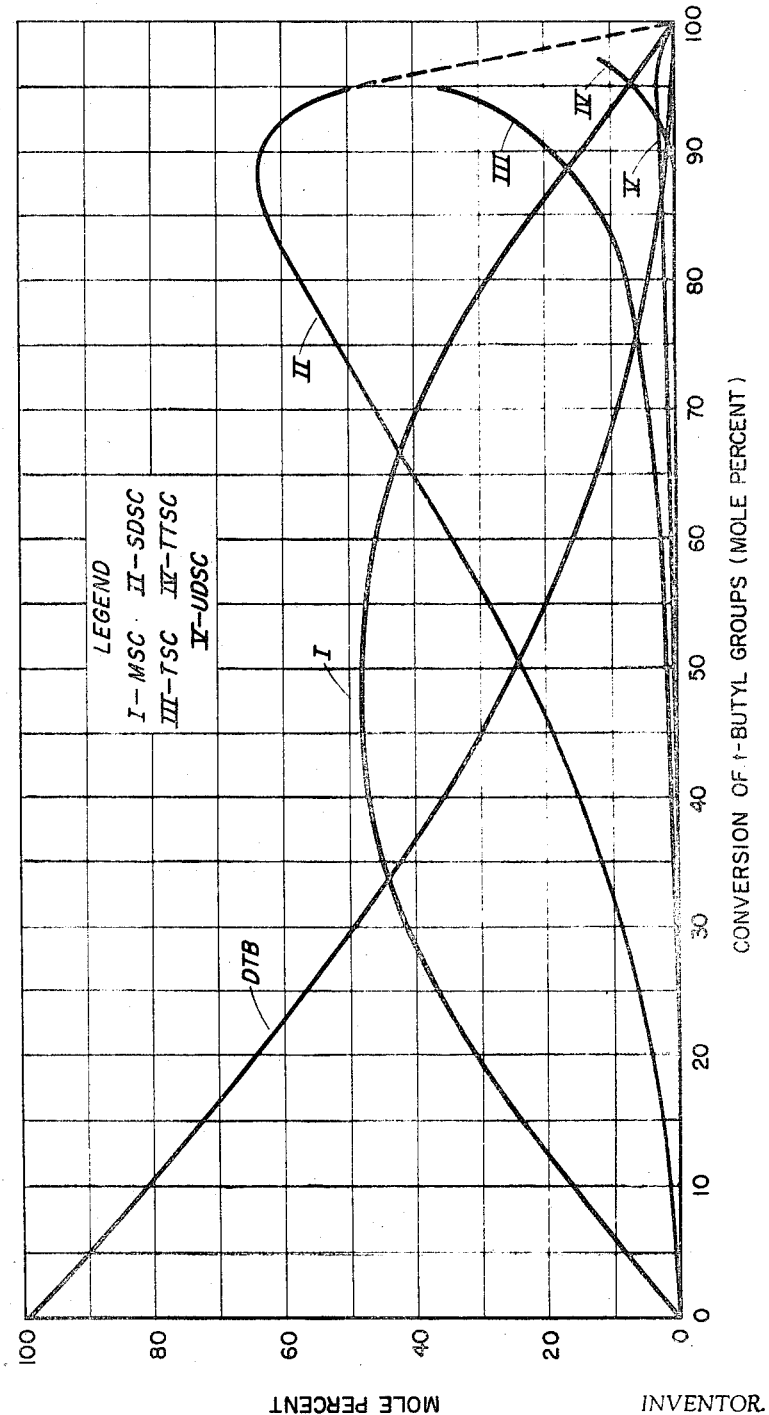

3,470,246
POLY (T-BUTYLSULFONYL CHLORIDE)
AROMATIC COMPOUNDS
Allan J. Lundeen, Ponca City, Okla., assignor to Continental Oil Company, Ponca City, Okla., a corporation of Delaware
Continuation-in-part of application Ser. No. 408,826, Nov. 4, 1964. This application May 27, 1968, Ser. No. 736,528
Int. Cl. C07c 143/70, 143/00
U.S. Cl. 260—543          5 Claims

ABSTRACT OF THE DISCLOSURE

Aryl poly (t-butylsulfonyl chlorides) are prepared by reacting $SO_2$ and $Cl_2$ with the desired aryl compound at below 100° C. in the presence of light.

DISCLOSURE

This application is a continuation-in-part of U.S. Ser. No. 408,826, filed Nov. 4, 1964 and now abandoned.

This invention relates to poly(t-butylsulfonyl chloride) aromatic compounds, and particularly to poly(t-butylsulfonyl chloride) benzenes and certain derivatives thereof. The invention also relates to a process for preparing these sulfonyl chloride aromatic compounds.

It has been known for some time that alkyl aromatic hydrocarbons can be reacted with chlorine and sulfur dioxide in the presence of light to introduce a sulfonyl chloride group or groups into the alkyl substitute. This reaction has become known as the Reed reaction from the discoverer. The Reed reaction is described in numerous patents which include: Re. 20,968, 2,263,312, 2,321,022, 2,346,568, and 2,749,365.

A problem in the Reed chlorosulfonation reaction is that simple chlorination can become an important side reaction. Also it has been difficult to control the chlorosulfonation itself in order to introduce only the desired number of sulfonyl chloride groups.

It has been discovered that poly-t-butyl aromatic compounds can be chlorosulfonated according to the Reed reaction to give the desired number of sulfonyl chloride groups on each t-butyl group by controlling the reaction conditions, especially in the amount of chlorine ($Cl_2$) introduced, and by maintaining a substantial excess of sulfur dioxide in the reaction zone.

There has been discovered a new class of alkylsulfonyl chloride compounds which are the poly(t-butylsulfonyl chlorides) of benzene, naphthalene or biphenyl. The benzene compounds include para-sym (t-butylmonosulfonyl chloride) benzene; para (t-butylmonosulfonyl chloride, t-butyldisulfonyl chloride) benzene, and para-sym (t-butyldisulfonyl chloride) benzene.

The novel process of the invention comprises the reaction of liquid poly-t-butylaromatic, where aromatic is benzene, naphthalene or biphenyl, with chlorine in the presence of sulfur dioxide, at a temperature below about 100° C., in the presence of light. The sulfur dioxide is present in an amount substantially in excess of the theoretical requirement and the chlorine usage, temperature and sulfur dioxide are controlled to minimize chlorination reaction consistent with the desired sulfonyl chloride content of the product. The poly-t-butylbenzenes are a preferred feed to the process.

FIGURE 2 shows the relation of conversion of t-butyl groups with the type of chlorosulfonated product with para-di-t-butylbenzene feed, the especially preferred feed.

Figure 1:
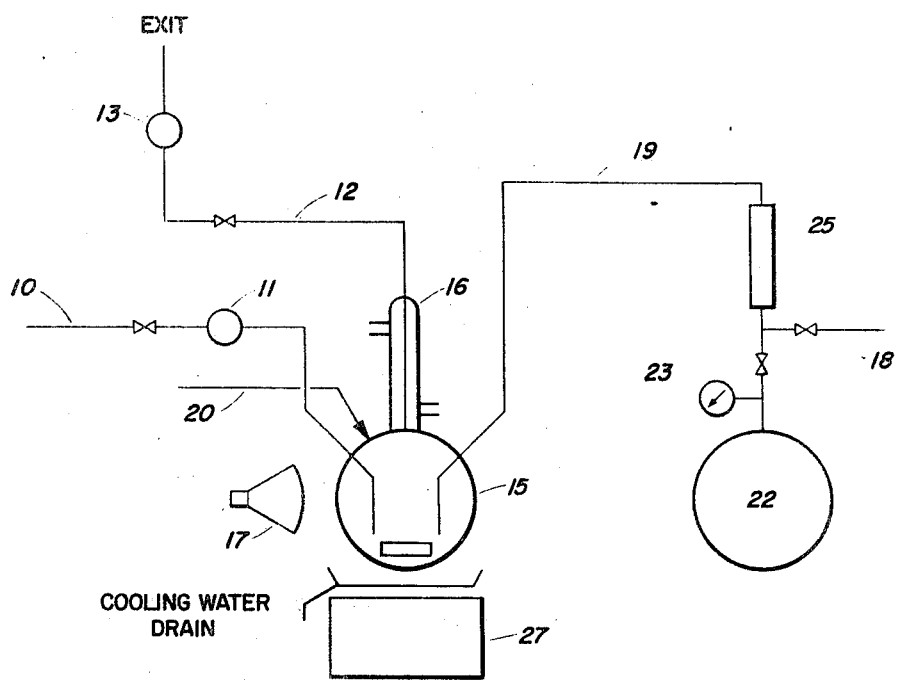
FIGURE 1 shows schematically the layout of the equipment used in some of the chlorosulfonation reaction work.

Chlorine is charged to the reaction zone either in the form of the free gas or in the form of sulfuryl chloride (sulfonyl chloride).

The desired chlorosulfonation reaction requires that the poly-t-butylaromatic feed be in the liquid state. The feed itself may be in the liquid condition, such as operating at a temperature above the melting point of the feed. Or, the feed may be dissolved in a solvent therefor. The solvent may be a material which does not react with either chlorine or sulfur dioxide. However, liquid sulfur dioxide is an excellent reaction medium in that it dissolves the feed and provides reactant.

Certain chlorohydrocarbons and benzene are preferred solvent reaction medium. Illustrative of these are: carbon tetrachloride, di-chloroethane and benzene.

The sulfur dioxide is present in an amount substantially in excess of the theoretical requirement for the product desired. The theoretical requirement is one mole for each sulfonyl chloride group introduced. In practice the feed and solvent, if any, is saturated with sulfur dioxide and additional sulfur dioxide is introduced along with the chlorine in order to have an excess at all times. In general, good results are obtained when the sulfur dioxide introduction rate is about 2–4 times, in amount, the rate of introduction of chlorine gas. In general, the $SO_2$ usage is about 2–20 times the theoretical requirement, although larger excesses may be used.

It has been observed that simple chlorination is suppressed by the presence of excess sulfur dioxide in the reaction zone. This appears to be related to the amount of sulfur dioxide dissolved in the liquid feed or feed solution. Because operation at super atmospheric pressure results in less simple chlorination than does operation at atmospheric pressure with other conditions being equal, the use of liquid sulfur dioxide as the solvent reaction medium appears to be the ultimate procedure for minimizing the chlorination side reaction.

The chlorosulfonation reaction, even at short reaction times, produces more than one sulfonyl chloride reaction product. When it is desired to produce a reaction product where each t-butyl group includes only one sulfonyl chloride group, it has been discovered that the chlorine addition must be held below the theoretical one mole for each t-butyl group. In the case of poly-t-butylbenzene feed the chlorine introduction is maintained in an amount of not more than 90% of the theoretical for the production of compounds having only one sulfonyl chloride group in each t-butyl group; preferably this chlorine usage is about 65–85% of the theoretical.

After each t-butyl group has been reacted with one sulfonyl chloride group, the rate of further addition is very much slower; observations indicate that the rate of addition of a second sulfonyl chloride group to a t-butyl group already including one sulfonyl chloride group, is about one-tenth the rate of addition of the first sulfonyl chloride group. It is indicated that for the addition of a second or third sulfonyl chloride group, it is necessary to operate with chloride introduction in excess of the theoretical. The simple chlorination reaction is minimized under these conditions by operating with a larger excess of sulfur dioxide, using lower temperature and shorter reaction times.

It has been discovered that the temperature of reaction must be maintained below about 100° C. in order to hold down simple chlorination. Desirably, the reaction temperature is held between about 0° and 70° C. In the case of poly-t-butyl-benzene feed directed toward the production of monochlorosulfonated t-butyl group, it is preferred to operate at a temperature of about 40°–65° C.

The types of chlorosulfonated compounds which can be prepared by the process of the invention are illustrated by five configurations, wherein para-di-t-butylbenzene is the starting feed. Compound I represents a product wherein one t-butyl group has been reacted to add one sulfonyl chloride group. This compound has been named para (t-butyl, 5-butylmonosulfonyl chloride) benzene. It can also be named benzene, 1-t-butyl-4-t-butylmonosulfonyl chloride. For simplicity in the description, compound I will be referred to as MSC.

Compound II has each t-butyl group including one sulfonyl chloride group. For this reason this compound is considered to be symmetrical, and has been named para-sym (t-butylmonosulfonyl chloride) benzene. Or, it can be named benzene, 1,4-di-t-butylmonosulfonyl chloride. For simplicity this compound will be referred to as SDSC.

Compound III is a trisulfonyl chloride, wherein one t-butyl group includes two sulfonyl chloride groups. This compound has been named para(t-butylmonosulfonyl chloride, t-butyldisulfonyl chloride) benzene. Or, it can be called benzene, 1-t-butylmonosulfonyl chloride-4-t-butyldisulfonyl chloride. For simplicity this compound will be referred to as TSC.

Compound IV includes two sulfonyl chloride groups in each t-butyl group. It has been named para-sym (t-butyldisulfonyl chloride) benzene. Or, it can be named benzene, 1,4-di-t-butylsulfonyl chloride. For simplicity compound IV will be referred to as TTSC.

Compound V is a disulfonyl chloride where both sulfonyl chloride groups are included in the same t-butyl group. This is the unsymmetrical analog of compound II, SDSC.

I. (MSC) 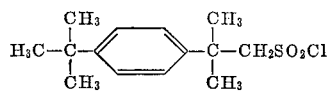

II. (SDSC) 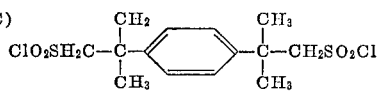

III. (TSC) 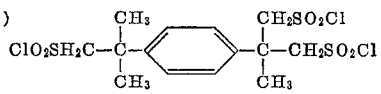

IV. (TTSC) 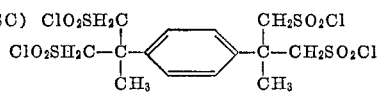

V. (UDSC) 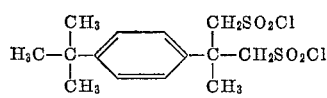

It has been named para (t-butyl, t-butyldisulfonyl chloride) benzene. Or it can be named benzene, 1-t-butyl-4-t-butyldisulfonyl chloride. For simplicity it will be referred to as UDSC.

In the case of tri-t-butylbenzene, the chlorosulfonation reaction produces compounds whose configuration may be readily deduced from Compounds I–V.

It can be seen that the new compounds of this invention, because of their polyfunctional reaction groups are extremely useful chemical intermediates. For example, these para-t-butylsulfonyl chloride compounds permit the formation of condensation polymers having a rigid backbone.

Illustrations of useful intermediates which can be made from the poly (t-butylsulfonyl chloride) benzenes are the poly (t-butylsulfonylamide) benzenes. These include the N-substituted amides. For example, para-sym (t-butylsulfonamido, N-methyl) benzene. This latter compound is shown in configuration in Example 7.

The sulfonyl chloride compounds of this invention can be converted to their corresponding alkali metal salts by treatment with an alkali metal hydroxide; the salt of the compound is useful as a surfactant. The compounds per se are useful as textile assistants. The compounds can be esterified with a phenol or hindered alcohol, and the resulting esters are useful as thermally stable plasticizers and as a hydraulic fluid.

It has been observed that the polysulfonyl chloride compounds are essentially insoluble in paraffin hydrocarbons at room temperature. For example, the polysulfonyl chloride compounds can be precipitated from solution in chlorohydrocarbons by the addition of paraffin hydrocarbon in sufficient amount. However, the number of sulfonyl chloride groups present affect the solubility of these compounds in paraffin hydrocarbons and SDSC is more soluble in hot paraffin hydrocarbons than is TSC.

A preferred embodiment of the process of the invention takes advantage of solubility characteristics. The chlorosulfonation reaction product is treated to recover the unreacted poly-t-butylbenzene and the para (t-butyl, t-butylmonosulfonyl cholride) benzene, and one, or both of these, is recycled to the chlorosulfonation step; the product polysulfonyl chloride compound may then be purified by recrystallization from solvents as is further described in the working examples herein. Example 3 illustrates a recycle process for the preparation of SDSC in high yield.

ILLUSTRATIONS

The following illustrations of preparation of t-butyl sulfonyl chloride compounds used para-di-t-butyl-benzene (DTB) M.P. 76–78° C.; Mathieson sulfur dioxide, 99.98%; and chlorine 99.5%.

It was established that the best analytical tool for following the reaction and determining the reaction product composition was Nuclear Magnetic Resonance (NMR) spectroscopy. Pure DTB has two NMR absorption lines. As chlorosulfonation proceeds, additional lines appear; chlorination also introduces additional lines. Pure p-sym (t-butylsulfonyl chloride) benzene (SDSC) shows three lines having delta values of 7.36 p.p.m., 4.00 p.p.m. and 1.68 p.p.m. in a ratio of 1:1:3.

Example 1

UDSC was prepared for NMR analysis as follows: A solution of 50 g. of DTB in 50 ml. of benzene was placed in a 300-ml. flask and warmed to 50° with a sun lamp. Chlorine and $SO_2$ were passed in at the rate of 100 and 200 ml. per minute for two hours.

The addition of 200 ml. of pentane to this mixture caused a crystalline product to separate (9 g., M.P. 92–5° C.). This was recrystallized to a constant M.P. (97.2–97.8° C.) from hexane-benzene. The NMR spectrum of this compound has three lines in ratios 1:1:3. The following hydrogen analysis was obtained by NMR: Calculated for $C_{14}H_{20}Cl_2O_4S_2$: H, 5.42 percent; found H, 5.38 percent. The ultraviolet spectrum has a maximum at 226 mu; ε max.=6800. The most intense bands in the infrared spectra of the DSC are bands at 1165 cm.$^{-1}$ and 1365 cm.$^{-1}$ due to the —$SO_2Cl$ group.

Exemplary procedure.—The apparatus used in a study of the variables in chlorosulfonation of p-di-t-butyl benzene, partially chlorosulfonated DTB and also of mono-t-butyl benzene is shown in FIGURE 1. For operation at atmospheric pressure the $SO_2$ inlet line 10 was provided with flowmeter 11; the valved exit line 12 was open to the atmosphere in a hood. For superatmospheric pressure work, flowmeter 13 was inserted into line 12. Reactor 15 was a 500 ml., 3-neck flask. The gas and vapors from reaction 15 were passed through a water cooled condensor 16 before passing to vent line 12. The reactor used a Teflon plug with an O-ring seal in place of the usual rubber stopper. Holes for entrance and exit lines were drilled to insure a tight fit. Saran tubing was forced through the somewhat undersized holes, and glass frits were placed on the ends of $SO_2$ and $Cl_2$ lines.

The same procedure was used in both atmospheric and pressure runs. A solution of DTB in $CCl_4$ was placed in the reactor. The light 17 was turned on, and $SO_2$ passed into the reactor at about 200 ml. per minute. A slow stream of argon from line 18 was admitted through the chlorine line 19 to prevent backup in the lines. As the lamp warmed the reactor, a jet of water from line 20 was directed at the outside of reactor 15 to maintain the desired temperature. After about 15 minutes, the reaction mixture was adequately purged of air, and the temperature had stabilized (ca.±1°). Chlorine was admitted at the desired flow from a 1.7-liter storage bomb 22.

The flow of $SO_2$ in atmospheric or pressure runs was determined from the flowmeter reading and was held at 250–280 ml. per minute. The pressure runs were carried out at $SO_2$ cylinder pressure of 35–40 p.s.i.g. Chlorine flow could be followed by pressure drop at gauge 23 and (for atmospheric pressure) flowmeter 25 reading. The contents of the reactor were agitated by magnetic stirring 27.

Example 2

A solution of 10 g. of DTB in 85 ml. of $CCl_4$ was chlorosulfonated at 62+1° and 38 p.s.i.g. for 98 minutes. A 15-pound pressure drop was noted in the chlorine bomb. From peak heights in the methyl region, 1.4 moles of chlorine per mole of DTB reacted. The product distribution from relative peak heights of aromatic hydrogens (neglecting chlorination and disulfonation) of DTB, MSC, and DSC of 5:38:57 agreed very well with calculated values.

Example 3

In a glass pressure reactor was placed 30 g. (0.16 moles) of p-di-t-butylbenzene and 100 ml. $CCl_4$. The mixture was pressured to 40 p.s.i. with $SO_2$ and a continuous flow of $SO_2$ assured by venting at the rate of 200 ml./min. A lamp was placed 6 cm. from the reactor, the heat from which warmed the mixture to 62–3°. A stream of air directed at the reactor was used to maintain this temperature. Chlorine was passed into the mixture until 0.16 mole had reacted (33 p.s.i. drop from a 1.7 l. bomb). By NMR the mixture was 26% II, 50% I and 24% DTB.

Carbon tetrachloride was stripped from the mixture and 100 ml. pentane added. A solid formed rapidly which was removed by filtration to give 15 g. crude II. (Theory based on 26% conversion to II is 15.5 g.) Recrystallization from carbon tetrachloride and then 1-chlorobutane gave SCSC, 12 g., M.P. 96–7° which was pure by NMR.

The liquid from the crude isolation of SDSC was stripped of solvent to yield 30 g. of oil which was a mixture of DTB and MSC. Nine grams of DTB and 100 ml. $CCl_4$ was added and the mixture chlorosulfonated as before until 0.11 mole of chlorine had been added. The product was isolated in crude form as before and the product crystallized from a mixture of 1-chorobutane and hexane (1:1). This was repeated for a total of six cycles with an average yield of purified material (M.P. 96–7) of 11.0 g. (61%) for each cycle. An impure fraction (mainly SDSC of 5–7 g. which did not crystallize was also obtained.

Examples 4+

A solution of 20 g. of DTB in 100 ml. of $CCl_4$ was chlorosulfonated at 60° for 90 minutes at atmospheric pressure. Chlorine flow was 40 ml. per minute, and $SO_2$ flow was 150 ml. per minute. The NMR spectrum of the reaction mixture indicated much more chlorination and less chlorosulfonation than a similar reaction under ca. 40 p.s.i.g. $SO_2$ pressure.

Comparisons of a reaction conducted at 37° and otherwise similar conditions show that less chlorination and more dichlorosulfonation occur at the lower temperatures.

Example 5

A large amount of DTB was chlorosulfonated in order to permit an investigation of the other chlorosulfonates which are produced in only small amounts.

A solution of DTB in $CCl_4$ (100 g., 200 ml.) was chlorosulfonated at 37±3°. Chlorine and $SO_2$ flows were 85–90 ml. per minute and 260–280 ml. per minute. Samples were analyzed after pressure drops (chlorine charge bomb) of 110, 165, 199, and 223 p.s.i.g. Conversion and dichlorosulfonation were calculated from the NMR spectra from areas of peaks in the methyl region. Values for dichlorosulfonation compound V, UDSC were checked by peak areas in the methylene region.

| Sample | DTB conversion | Dichloro-sulfonation | Chlorine pressure drop (p.s.i.g.) |
|---|---|---|---|
| 1 | 48 | ca. 1.5 | 110 |
| 2 | 65 | 3.1 | 165 |
| 3 | 75 | 5.4 | 199 |
| 4 | 83 | 7.8 | 223 |

To the reaction mixture were added 300 ml. of pentane with stirring. SDSC crystallized rapidly and was removed by filtration. Evaporation of the pentane gave a nearly colorless oil (26 g., 17 percent based on DTB) which was nearly pure MSC by NMR.

The crude SDSC was extracted repeatedly with 400-ml. portions of boiling isooctane. In each extraction, the mixture was boiled briefly; and the isooctane was decanted from the lower phase. The SDSC crystallized from hot isooctane extracts and the isooctane were used in a subsequent extraction. Isooctane extracts were colorless, but the residue was a medium yellow color. Extractions and product recovered are summarized below. The NMR spectrum of fraction A shows the reduction in dichlorosulfonate.

Fraction A: 5 extractions; 62 g.; M.P. 92–97°; 1.6% dichlorosulfonate

Fraction B: 3 extractions; 35 g.; M.P. 88–95°

Fraction C: 3 extractions; 27 g.; 5.2% of dichlorosulfonate

A residue of 33 g. remained after the last extraction. Extraction of fraction C again two times gave 23 g. of crude SDSC (M.P. 80–92°) and a residue of 4 g.

The residue from isooctane extraction is insoluble in hot $CCl_4$ (the complete mixture was soluble). All residues (37 g.) were dissolved in a $CH_2Cl_2$—$CCl_4$ mixture. Crystals, 18.2 g., M.P. 122–24° formed overnight. Recrystallization from the same solvent mixture gave crystals M.P. 128–130°. The NMR spectrum of this material indicated that it was the trisulfonylchloride, TSC(III).

The semipure SDSC (120 g., 90–95 percent pure, 55 percent yield based on DTB) was crystallized from 1-chlorobutane. The first crop, 68 g., M.P. 97°, was pure by NMR. The methyl region was examined carefully by NMR using $C^{13}$ resonance lines for comparison. The content of unsulfonated t-butyl groups in this material was less than 0.05 percent. Attempts to recover additional material caused the trisulfonylchloride to appear; so this material was extracted with hot isooctane as before. An additional 20 g. of SDSC were isolated after a crystallization from 1-chlorobutane, M.P. 97°. The residue of 29 g. was a mixture of di and trisulfonylchloride which was not further separated.

Examples 6+

Crystallization of SCSC.—Carbon tetrachloride was a satisfactory solvent for crystallization of SDSC; however, if the crude SDSC had a TSC concentration greater than ca. 3 percent, crystallization was very slow; and the product would be contaminated with the TSC. Superior solvents for crystallization of SDSC were 1-chlorohexane, 1-chlorobutane, and mixtures of these with hexane.

The symmetrical disulfonylchloride (SDSC) and trisulfonylchloride (TSC) both precipitate from the reaction mixture with the addition of pentane. When the quantity of TSC is relatively high (5 percent) the SDSC does not crystallize readily. The SDSC and TSC can be separated by extracting the SDSC from the total with hot isooctane. Removal of 50 percent of a mixture (7.8 percent SDSC) by extraction with hot isooctane reduced the SDSC content to about 1.6 percent in the fraction removed. The fate of unsymmetrical disulfonylchloride UDSC in this separation is uncertain.

FIGURE 2.—The data on chlorosulfonation of mono-t-butylbenzene (MTB) established that the rate of entry of a second chlorosulfonate group into the t-butyl group was about 1/10 of the first reaction. Equations were derived from a theoretical consideration of the chlorosulfonation reaction for p-d-t-butylbenzene, data on MTB and stoichiometric relations. The equation description of chlorosulfonation of DTB as set out in FIGURE 2 is supported by actual test data.

Example 7

A solution of SDSC in benzene; 25 g./100 ml. was prepared. (Methylene chloride can be used.) This solution was added slowly to an ether solution of methylamine, 20 g. methylamine/100 ml. ether. The reaction is rapid and exothermic and temperature was controlled with ice. The unreacted amine and the solvents were removed overhead by distillation. The bottoms material was slurried in water. The crude solid product was recovered by filtration. The solid was recrystallized from hot 1 N sodium hydroxide. The pure para-sym (t-butylsulfonamido, N-methyl) benzene had a melting point of 153–154° C. The carbon, hydrogen, sulfur content was:

Calculated: C, 51.1; H, 7.5; S, 17.0. Found: C, 51.0; H, 7.5; S, 17.1.

This product is indicated to have the configuration:

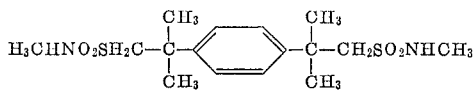

Note: All temperatures are centigrade.

Thus having described the invention, what is claimed is:

1. 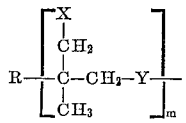

where R is selected from benzene, naphthalene, and biphenyl, $m$ is from 1 to 3 where R is benzene, from 1 to 4 where R is naphthalene, and from 1 to 6 where R is biphenyl, and X and Y are each selected from hydrogen and sulfonyl chloride with at least one sulfonyl chloride group per molecule.

2. 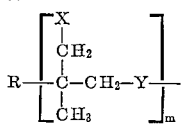

where R is benzene, $m$ is from 1 to 3, and X and Y are each selected from hydrogen and sulfonyl chloride with at least one sulfonyl chloride group per molecule.

3. Para-sym (t-butylmonosulfonyl chloride) benzene.

4. 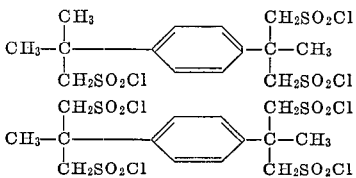

5. 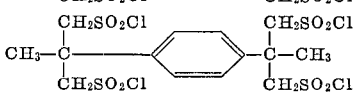

References Cited

UNITED STATES PATENTS 2,321,022   6/1943   Fox _____ 260—543 XR

LORRAINE A. WEINBERGER, Primary Examiner

HAROLD C. WEGNER, Assistant Examiner

U.S. Cl. X.R.

252—353; 260—556